United States Patent [19]

Lind

[11] 4,076,790
[45] Feb. 28, 1978

[54] METHOD OF EMBODYING A FOIL SHEET IN A THERMOPLASTIC OBJECT DURING THE PROCESS OF MANUFACTURING SAID OBJECT

[76] Inventor: Evald Törbjorn Gustav Lind, Silfverloodsgatan 9, S-461 00 Trollhattan, Sweden, S-461 00

[21] Appl. No.: 609,057

[22] Filed: Aug. 29, 1975

Related U.S. Application Data

[63] Continuation of Ser. No. 424,829, Dec. 14, 1973, abandoned.

[30] Foreign Application Priority Data

Dec. 18, 1972 Sweden .............................. 16547/72

[51] Int. Cl.² ............................ B29D 3/00; B29C 6/02
[52] U.S. Cl. .................................... 264/266; 264/138; 264/247; 264/267; 264/268; 264/275; 264/327
[58] Field of Search ................ 264/247, 275, 266, 153, 264/154, 157, 265, 267, 259, DIG. 34, 246, 268, 138, 327

[56] References Cited

U.S. PATENT DOCUMENTS

| 699,632 | 5/1902 | Richards | 264/266 |
|---|---|---|---|
| 2,619,679 | 12/1952 | Baldanza | 264/247 |
| 2,684,502 | 7/1954 | Paulve | 264/266 |
| 3,154,617 | 10/1964 | Schenk et al. | 264/328 |
| 3,270,101 | 8/1966 | Jardine et al. | 264/247 |
| 3,331,904 | 7/1967 | Friedman | 264/DIG. 34 |

Primary Examiner—James B. Lowe
Attorney, Agent, or Firm—Haseltine, Lake & Waters

[57] ABSTRACT

A method of incorporating a pre-cut foil sheet in a container moulded from a thermoplastic material by injection moulding techniques during the process of moulding the container. The foil sheets are fed singly from a store to a position of registry with the free end of the plunger forming part of the mould of the injection moulding apparatus, whereafter the mould is closed, the foil sheet being wrapped around the plunger upon entry thereof into the die. A moulding compound is then injected into the mould. The stream of moulding compound entering the mould is guided so that the foil sheet is either located on the inner surface of the moulded object or on the outer surface thereof.

1 Claim, 13 Drawing Figures

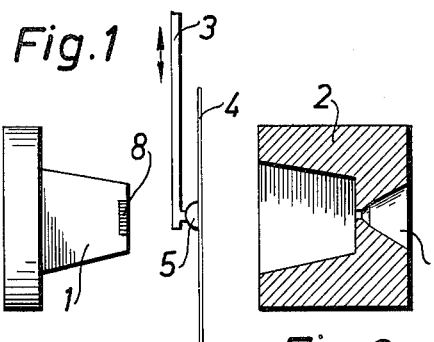
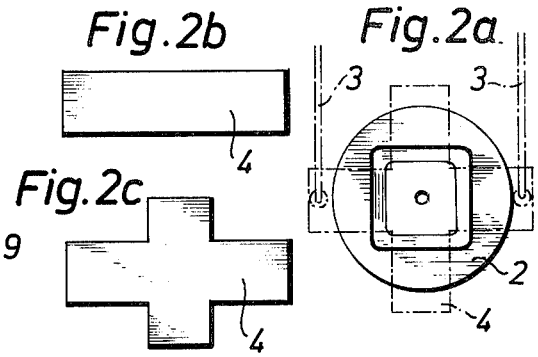
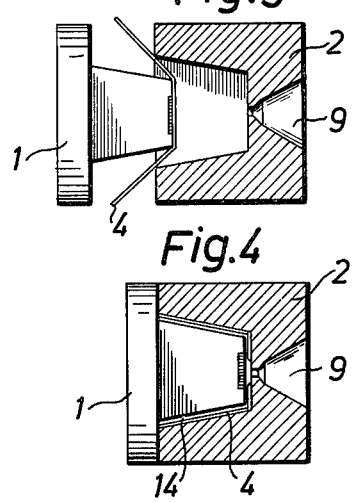
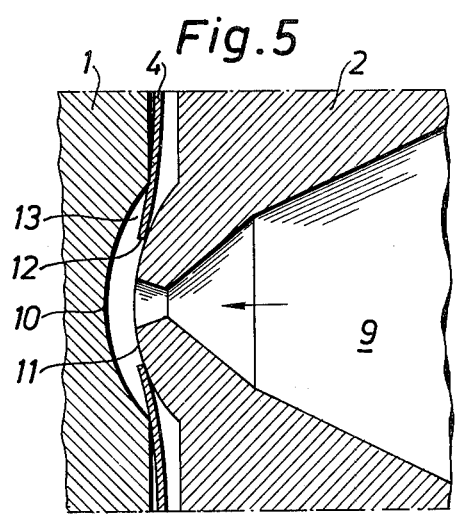
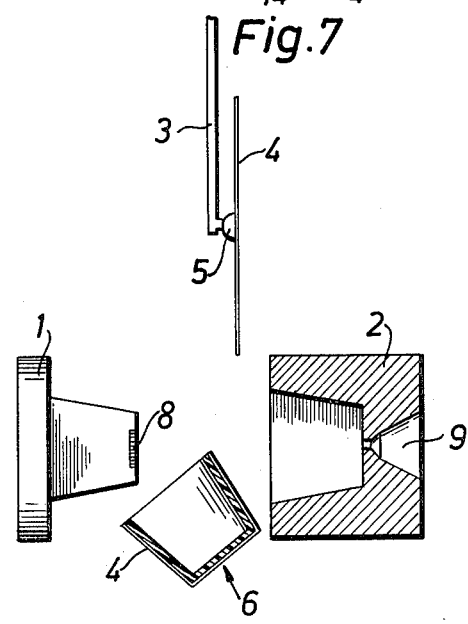
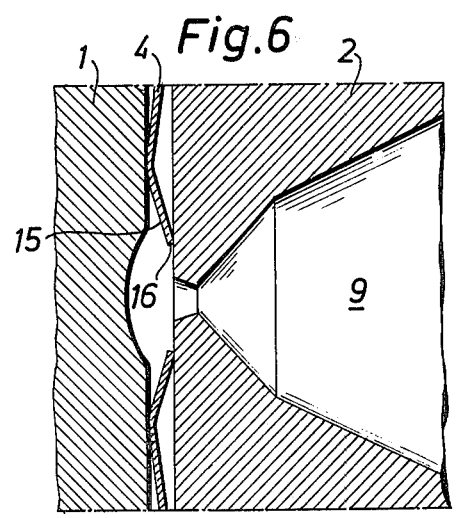

Fig. 8
Fig. 10
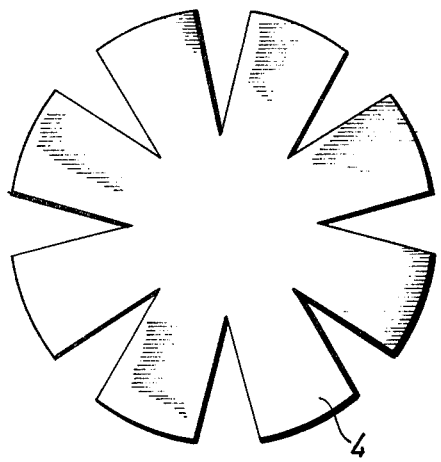
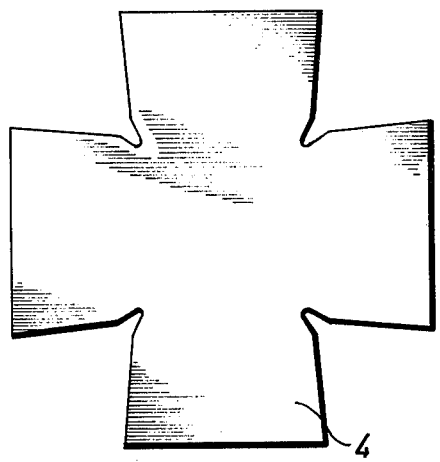
Fig. 9
Fig. 11
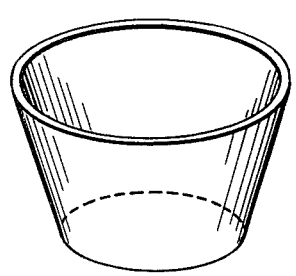
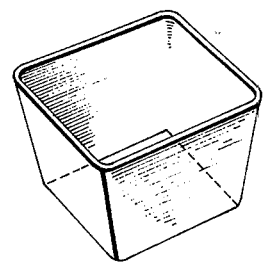

METHOD OF EMBODYING A FOIL SHEET IN A THERMOPLASTIC OBJECT DURING THE PROCESS OF MANUFACTURING SAID OBJECT

CROSS-RELATED APPLICATION

This application is a continuation of copending application Ser. No. 424,829 filed Dec. 14, 1973, now abandoned, and claiming the priority of Swedish application 16 547/72 filed Dec. 18, 1972.

The present invention relates to a method of embodying a thin film of material, for example to serve as a diffusion barrier or a label, in a thermoplastic object, such as a preserving container, wherein the film is introduced between a pair of open mould tools, such as the plunger and die of an injection moulding machine, whereafter the mould is closed and the moulding compound injected thereinto.

The incorporation of a film of material in a container or similar object serving as a packaging device can serve to eliminate one of those greatest disadvantages found with the use of the most conventionally used viz., inexpensive thermoplastic materials, such as styrene and olefine resins, namely their high permeability to gases, flavoring agents and water. These disadvantages have greatly restricted the use of such materials in packaging containers, for example, for certain types of food-stuffs, light chemical products such as toilet waters and cosmetics etc. With containers manufactured from the aforementioned thermoplastic materials, the deleterious effects obtained by the reaction of the contents of such containers with the materials has, in a number of cases, prohibited the use of said materials and necessitated the use of other more expensive materials. It is also conventional practice to provide container made from a thermoplastic material by injection moulding techniques with decorative patterns and designs, either in a single color or in a number of colors. Such decorative patterns may be provided in label form or by transfer techniques, (i.e., so called decors) for example. The thin material film aforementioned may thus also serve as a label and-/or as a means of providing the container with a decorative design.

The expedient of pre-printing a thin film from the same plastic material as that from the container is to be made and to place the film in the mould before the moulding compound is injected thereinto has long been known in the art. In the known art, the film fuses to the plastic material injected into the mould and forms a part of the manufactured container. It is similarly known to use a paper laminate coated with plastic material instead of a single plastic film, said paper laminate fusing to the moulding compound injected into the mould. The advantage afforded by these methods is that a decorative label or decor is obtained which is seated securely in the container and which is relatively inexpensive when produced in large quantities, since the film can be offset-printed in several colors at high production rates. The known methods, however, are encumbered with the disadvantage whereby the task of placing the clipped or punched film or foil into the moulds takes a certain portion of the production time, thereby prolonging the working cycle as compared with containers produced with no decors. The costs involved in producing the single films or the laminates is also higher than if ordinary paper could be used.

It has also been proposed to feed a strip of decorated plastic foil from a storage reel through a heating device and in between the mould halves of an injection moulding machine, wherein pieces of foil are punched from the foil strip, softened in the heating device, and shaped between the mould dies before the moulding compound is injected into the mould and melts or fuses together with the foil material. This method makes it necessary to cover the whole of the object with the foil while at the same time the fact that the foil must be softened and shaped places relatively narrow limits on the choice of useable foil material.

An object of the present invention is to provide a method which enables a non-softened, relatively rigid foil or film, pre-made to size from practically any material whatsoever, to be incorporated in a thermoplastic object, the choice of material from which said foil is made being controlled substantially by the desired properties of the foil with respect to its sealing ability and its printing suitability etc. It is also an object that the introduction of the foil into the injection moulding machine shall not lower the production rate of said machine.

These objects are achieved by the method of the present invention, which is mainly characterized by the steps of introducing pre-made and pre-sized pieces of foil one at a time between the mould halves of an injection type moulding apparatus, i.e., the plunger and die of said apparatus, respective foil pieces being introduced in conjunction with the opening of the mould to eject a moulded object, localizing said foil pieces and retaining the same in their localized position so as to substantially cover the free end surface of the plunger and so that at least one flap of said foil piece projects outside said end surface: closing the mould in a manner such that the foil flap is located along a side portion of said plunger; injecting the moulding compound into the mould to cause the foil piece to be placed on the desired side of the compound and to adhere thereto by the action of heat and pressure therefrom; and by simultaneously cooling the part of said moulding tool abutting said foil piece so as to avoid damage to said foil piece by heating.

The invention will now be described in more detail with reference to the accompanying drawings, in which FIG. 1 is a partially cut away side view of the open mould of an injection moulding machine immediately after a moulded container has been ejected therefrom and a foil piece has just been inserted between the mould halves.

FIG. 2a is a front view of the mould half shown in FIG. 1, said mould half having the form of a die, the foil piece and the foil piece insertion means being indicated by phantom lines.

FIGS. 2b and 2c show alternative embodiments of the foil piece.

FIG. 3 shows the mould halves of FIG. 1 in a later stage of the moulding process, in which the mould is being closed.

FIG. 4 is a view of the closed mould.

FIGS. 5 and 6 are longitudinal sectional views showing alternate construction of the injection nozzle of the die and corresponding portion of the plunger for injecting moulding compound through a hole located in the foil piece when said foil piece occupies the position shown in FIG. 4.

FIG. 7 illustrates the mould in an open position with a formed container being ejected from the mould. The Figure also shows a new foil piece being inserted between the mould halves.

FIGS. 8 and 9 show different embodiments of the foil piece and the container respectively, in which container the foil piece is incorporated as a completely covering coating.

FIGS. 10 and 11 show similarly a further embodiment of a foil piece and an associated container.

The mould illustrated diagrammatically in FIG. 1 comprises two mould halves, one mould having the form of a plunger 1 and the other the form of a die 2. Arranged for reciprocal movement between the mould halves is an insertion device 3, which is arranged to insert foil pieces 4, serving as labels or decors, between the mould halves in the open position of the mould, as shown in FIGS. 1 and 2a. The insertion means 3 comprises two parallel pipes provided at the bottom thereof with suction nozzles or perforated plates 5, by means of which the labels are sucked from a magazine (not shown) against the insertion means 3 to be firmly held thereby. The insertion means 3 is arranged to move to the vicinity of the magazine to draw a labels 4 therefrom and to move subsequently to a position of readiness above the mould 1, 2, as shown in FIG. 7. The labels may have a different shape from that shown, as may the moulded object. FIG. 2a shows a four-sided container and a cross-shaped label, which is intended to cover all four sides of the container. Two other embodiments of the label are shown in FIGS. 2b and 2c, said embodiments comprising a straight label which in addition to covering the bottom of the can also covers two opposing sides thereof, and a cross-shaped label which is intended to fully cover two opposing sides of the container and to cover one-half the remaining two opposing sides thereof.

Subsequent to the discharge of change a moulded container 6 (FIG. 7) from the mould, the mould is reclosed by moving the plunger 1 to the right as seen in the Figure. Simultaneously as the mould is closed, or slightly earlier, the insertion means 3 is moved downwardly with a label 4 held thereto by suction. The arrangement is such that the label occupies a position level with the two mould halves 1, 2 before it is engaged by the plunger 1 (see FIG. 1). At the end surface of the plunger facing the label there is provided a number of slots or openings 8 which communicate with suction means (not shown) and through which a suction effect can be applied to the label. When the plunger reaches the label, the label is drawn against said end surface of the plunger by said suction effect and is held fixed thereto. As the label is moved by the plunger into the die 2, the label is drawn from the suction means 5 of the insertion means 3. The mould is then closed (FIGS. 3 and 4), the label 4 being accommodated in the space between the outer surface of the plunger 1 and the inner surface of the die 2. The label can be caused to adhere to the inside of the object being formed or to the outside thereof in a manner hereinafter described.

When it is desired to place the label on the inside of the container, the label is preferably imperforate, so that as the moulding compound enters the die through nozzle 9 it folds the label around the plunger 1, so that the label is entrapped between the solidifying compound and said plunger. A number of different procedures can be applied when desiring to place the label on the outside of the container. One such procedure is illustrated in FIG. 5, which shows portions of the plunger 1 and die 5 in larger scale, together with an injection nozzle 9. In this instance the label 4 is planar and has an opening located in the center thereof which registers with the orifice of nozzle 9 when the mould halves are brought together. The die 2 is provided at the portion thereof around the nozzle 9 with an outwardly projecting arcuate portion 11 aranged to be accommodated in a corresponding convex recess 10 in the plunger 1. As will be seen from FIG. 5, when the mould halves are brought together, the edge 12 of the hole in the label 4 is pressed against the outwardly projecting arcuate portion 11 at the center of the die. When the molten plastic moulding compound is injected into the mould through the orifice of nozzle 9, the stream of moulding compound will penetrate into the space 13 between the label edge 12 and the concave recess 10 thereby pressing the label against said arcuate portion 11, thereby placing the label on the outside of the can. The flow of moulding compound continues to press the label against the wall of the die until the mould cavity 14 is filled.

Both mould halves 1 and 2 are temperature controlled by means of liquid circulating in channels disposed therein (not shown), the coolant used being one which maintains the mould relatively cold. As will be understood, the label is liable to be damaged upon prolonged contact with the molten compounds, but as a result of the high rate of speed and pressure at which the moulding compound is injected into the mould, the label is quickly and firmly pressed against the mould wall and is cooled very rapidly to a temperature at which it is not damaged by heat from the compound.

FIG. 6 shows an embodiment where the label 4 has a generally centrally arranged hole and where the center of the label has been folded at 15 to conical form with the edge 16 of the hole abutting a flat center portion of the die 2, the moulding compounds injected through nozzle 9 being guided between the edge 16 and plunger 1 so as to force the label against the walls of die 2, thereby positioning the label on the outside of the container.

As the moulding compound is injected into the mould and the moulded object is cooled therein, the insertion means 3 is returned to the label magazine to begin the next working sequence.

As will be understood, the label referred to above may be made from paper of appropriate quality, which may be printed in a decorative manner and punched or cut to the size of the container or object being produced. Since the label is inserted between the mould halves at the same time as the preceding container is ejected from the mould, no time is lost in the working cycle. Further, as a result of the high injection pressure of the molten moulding compound and of the high temperature thereof (approximately 200° – 300° C) the label will strongly adhere to the container. As beforementioned, the label is protected against damage by heat as a result of the cooling of the label against the mould.

Although the invention has hitherto been described with reference to a label, the aformentioned film may also be used as a diffusion barrier. Thus, in the manner aforedescribed a strip of foil can be punched or clipped to size so that, subsequent to being inserted in the mould it will more or less completely cover the object formed in the mould internally or externally. By using an appropriate foil which is resistant to the substances to be packed in the can or which is impermeable or only slightly permeable to gases, flavoring agents or water, a packaging unit can be obtained which fullfils all reasonable requirements and which has a supporting plastic portion and a sealing inner or outer portion of foil material. The foil may comprise one or more layers of a different material, e.g., aluminum, plastic and/or paper material. As will be obvious from the aforegoing, in the case of a multi-laminate foil having a paper side, the paper side can be turned to face the injected moulding compound. The foil pieces have a shape which conforms to different shaped packages, e.g., round and square containers, as shown in FIGS. 8 – 11.

The lids of the containers thus produced may also be provided with foil in a corresponding way. The combination is also conceivable whereby the foil pieces are used both as a label and a diffusion barrier. The foil pieces may also be arranged to be placed on the inside of a transparent plastic can, with the print on the label visible through the material. Further, the foil pieces shown in FIG. 8 for the container shown in FIG. 9 may be provided with decorative designs of respective flaps which, when joined together in the mould, form a coherent design. In other words, it is possible to transfer the design of the planar foil piece with a precision which lacks counterpart in the known method of shaping a strip-like, heat-softened foil label described in the introduction.

I claim:

1. A method of incorporating a sheet of foil in an object made from a thermoplastic material by injection moulding techniques during the process of making said object, said method comprising inserting foil piece between the plunger and die of an open mould in an injection moulding machine prior to the closing of the mould and to the injection of a moulding compound into the mould via an injection nozzle in said die, said foil piece being cut to size being inserted singularly between the open mould halves, said foil piece having a hole therein, said foil piece being inserted laterally between said mould halves from one side thereof at the same time as the mould is opened to eject a moulded object therefrom from the other side thereof, holding said foil piece in a localized position between the plunger and die so as to substantially cover the free end of the plunger with the hole facing said free end and the injection nozzle in the die, the foil piece having at least one flap projecting outside the end surface of the plunger, closing the mould while transporting the foil piece into the mould between the plunger and die so that the foil piece is bent to shape as the flap is folded into the die and located along one side portion of the plunger, said die being formed with a convex protrusion at said injection nozzle facing a central recess formed in the plunger such that when the mould is closed the convex protrusion on the die comes into contact with the edge of the foil surrounding the hole to displace the foil edge into the recess in the plunger while pressing the foil into contact with the plunger at the edge of said recess, injecting moulding compound into the mould through the injection nozzle in the die and through the hole in the foil piece, the foil piece being moved into abutment with the die by the influence of the moulding compound acting on said foil piece as a result of contact of the foil piece around the hole with the convex protrusion of the die around the injection nozzle, the flow of moulding compound from the nozzle being so deflected by the recess in the plunger, that said moulding compound is guided outwardly towards the foil piece away from the hole edge, so that the foil piece is caused to adopt a position on the outside of the moulding compound so as to adhere to said compound as a result of the heat and pressure exerted therefrom while cooling a mould portion abutting the foil piece so as to avoid damage to said foil piece.

* * * * *